(12) United States Patent
Liu

(10) Patent No.: US 10,124,846 B1
(45) Date of Patent: Nov. 13, 2018

(54) MOTOR DOLLY

(71) Applicant: Yiang-Chou Liu, Taipei (TW)

(72) Inventor: Yiang-Chou Liu, Taipei (TW)

( * ) Notice: Subject to any disclaimer, the term of this patent is extended or adjusted under 35 U.S.C. 154(b) by 0 days.

(21) Appl. No.: 15/590,844

(22) Filed: May 9, 2017

(51) Int. Cl.
*B62H 1/00* (2006.01)
*B62H 3/00* (2006.01)
*B60P 3/07* (2006.01)

(52) U.S. Cl.
CPC . *B62H 3/00* (2013.01); *B60P 3/07* (2013.01)

(58) Field of Classification Search
CPC ....... B62B 5/0083; B62B 29/002; B62H 3/00; B62H 1/02; B60P 3/07; B60P 3/125; B60P 1/00
See application file for complete search history.

(56) References Cited

U.S. PATENT DOCUMENTS

| | | | | |
|---|---|---|---|---|
| 1,513,725 A * | 10/1924 | Crosier | ................. | G10K 13/00 369/80 |
| 4,854,803 A * | 8/1989 | Coccaro | ............... | B60B 29/002 254/111 |
| 5,044,645 A * | 9/1991 | Eltvik | ................ | B60B 29/002 280/79.4 |
| 5,709,520 A * | 1/1998 | Pish | ....................... | B60S 13/00 254/7 B |
| 5,941,675 A * | 8/1999 | Orr | ......................... | B60P 3/127 280/402 |
| 7,097,406 B1* | 8/2006 | Gang | ................... | B60B 29/002 254/105 |
| 7,232,138 B2* | 6/2007 | Shubert | .................. | B60P 3/125 280/47.34 |
| 7,275,753 B1* | 10/2007 | Ceccarelli | .............. | B60P 3/127 280/43.21 |
| 7,815,201 B2* | 10/2010 | Ceccarelli, III | ........ | B60P 3/127 280/43.21 |
| 8,052,159 B2* | 11/2011 | Chen | ........................ | B62H 1/02 280/79.11 |
| 8,910,957 B1* | 12/2014 | Hassell | .................. | B60P 3/127 254/105 |
| 9,010,770 B2* | 4/2015 | Cantrell | ............... | B62B 5/0083 280/35 |
| 9,845,125 B1* | 12/2017 | Liu | .......................... | B62B 3/00 |

* cited by examiner

*Primary Examiner* — Hau V Phan

(57) ABSTRACT

A motor dolly comprises a first board member, a first supporting frame, a second supporting frame, a first connecting rod, a second connecting rod, a second plate and a third supporting frame. Each above-mentioned member is formed by stamping a plates into a U-shaped frame to provide better strength.

7 Claims, 10 Drawing Sheets

MOTOR DOLLY

BACKGROUND OF THE INVENTION

Field of the Invention

The present invention relates to a motor dolly, and more particularly to a motor dolly for a heavy motorcycle which is suitable for different motorcycles models.

Description of the Related Art

Riding heavy bikes is a very popular hobbit, and due to the heavy weight of the bike, stationary stands for motorcycles sometime is necessary for the riders. Typical stationary stands for motorcycles requires complicated manufacture processes.

Therefore, it is desirable to provide a multipurpose stand for a heavy motorcycle to mitigate and/or obviate the aforementioned problems.

SUMMARY OF THE INVENTION

An objective of the present invention is to provide a motor dolly suitable for different motorcycle models.

In order to achieve the above mentioned objective, a motor dolly has a first board member having an inclined plate, a plurality of pivot apertures, a connecting aperture, a plurality of pivoting members, a nut and two covering portions; the covering portion pushing against the second supporting frame, a first supporting frame having at least two rolling wheels and a plurality of pivot apertures; the plurality of pivot apertures of the first supporting frame corresponding to the plurality of pivot apertures of the first board member; a second supporting frame at least two rolling wheels and a plurality of pivot apertures; the plurality of pivot apertures of the second supporting frame corresponding to the plurality of pivot apertures of the first board member; a first connecting rod having a connecting hole, a plurality of securing holes and a plurality of pivoting member; the connecting hole of the first connecting rod corresponding to the connecting aperture of the first board member; a second connecting rod having a plurality of positioning apertures, a plurality of securing holes and a connecting hole; the positioning apertures of the second connecting rod corresponding to the securing holes of the first connecting rod; a second plate having a plurality of positioning apertures, a plurality of pivot apertures and a plurality of pivoting members; the positioning apertures of the second plate corresponding to the securing holes of the second connecting rod; a third supporting frame having two rolling wheels and a plurality of pivot apertures; the pivot apertures of the third supporting frame to the pivot apertures of the second plate.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
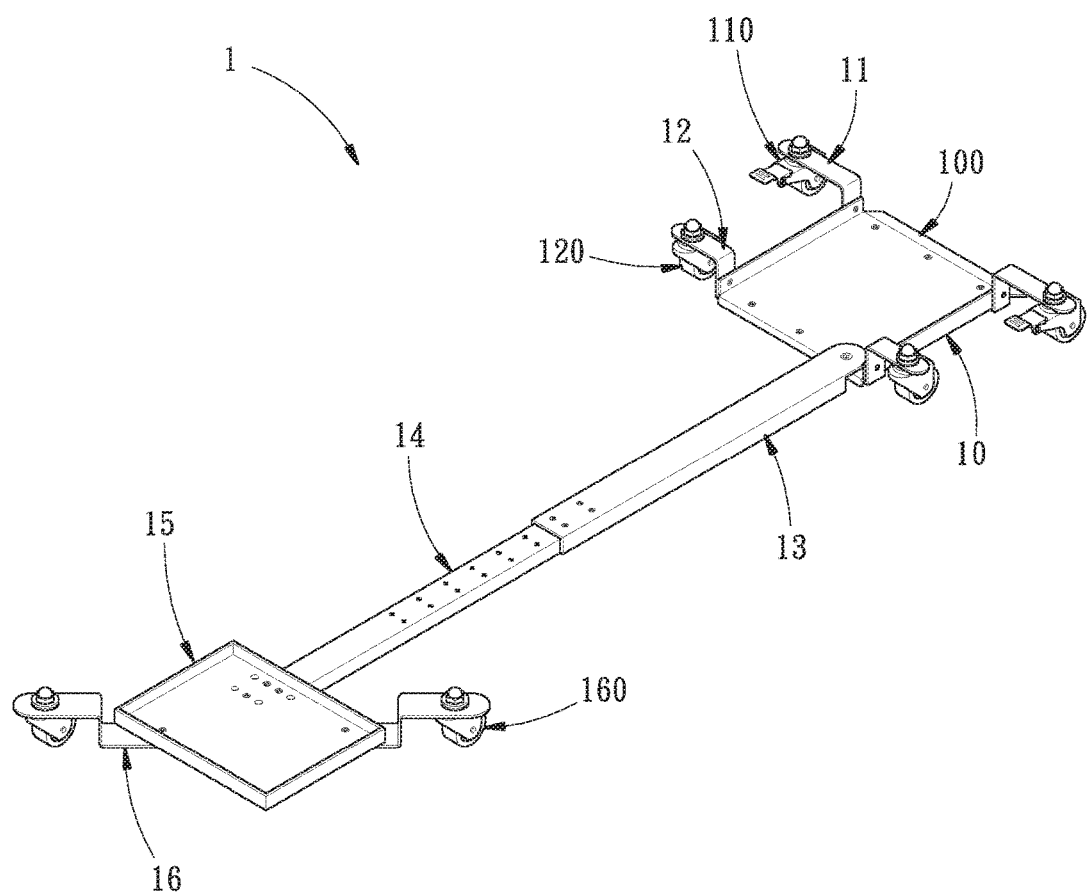
FIG. 1 is a perspective drawing of a motor dolly according to an embodiment of the present invention.
Figure 2:
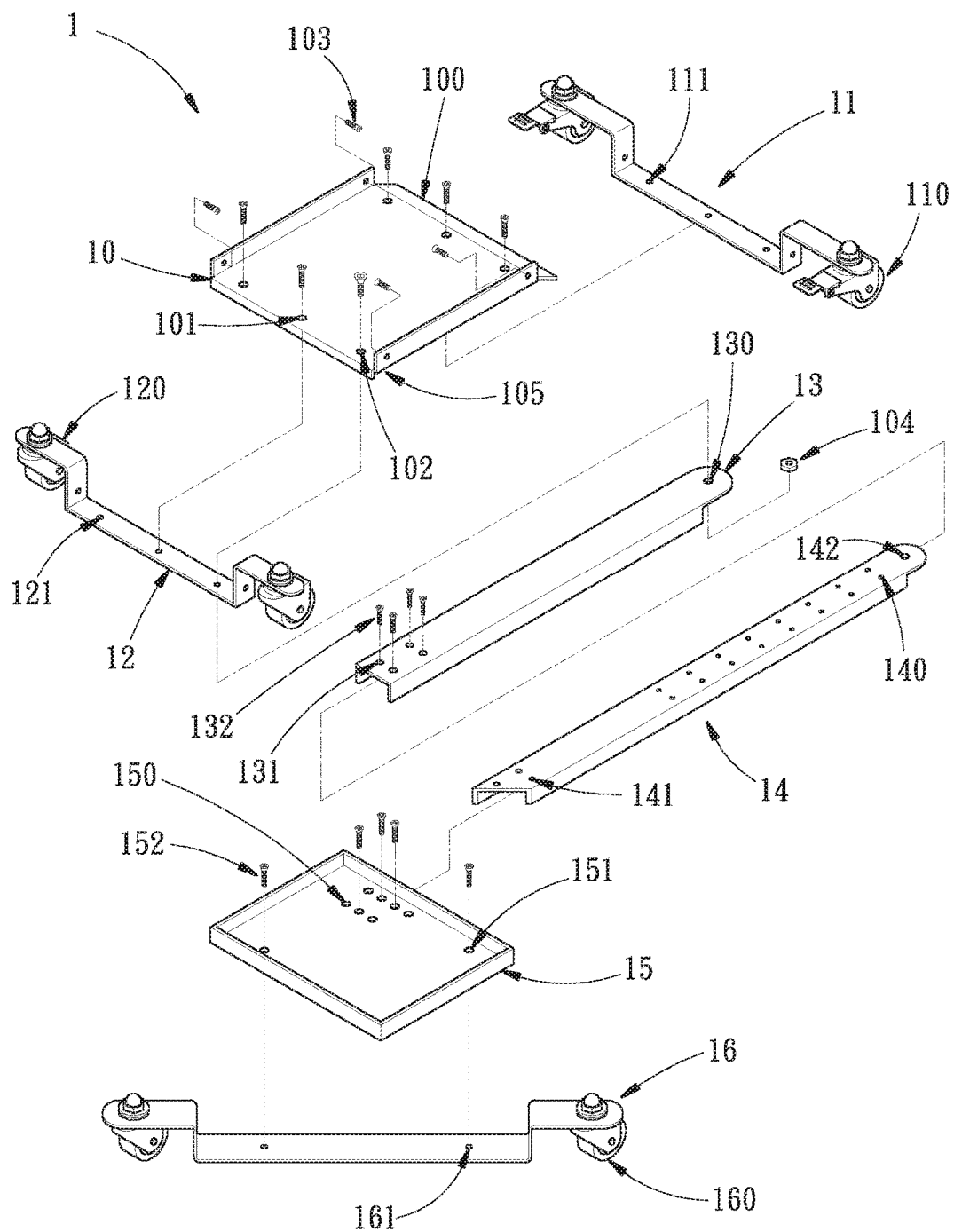
FIG. 2 is an exploded view of the motor dolly according to the embodiment of the present invention.

As shown in FIG. 1 and FIG. 2, A motor dolly 1 comprises a first board member 10, a first supporting frame 11, a second supporting frame 12, a first connecting rod 13, a second connecting rod 14, a second plate 15 and a third supporting frame 16. Each above-mentioned member is formed by stamping a plates into a U-shaped frame to provide better strength. The first board member 10 has an inclined plate 100, a plurality of pivot apertures 101, a connecting aperture 102, a plurality of pivoting members 103, a nut 104 and two covering portions 105. The inclined plate 100 is provided at one side of the first board member 10, and the pivot apertures 101 are disposed on two sides and two opposite sidewalls of the first board member 10. The pivot apertures 101 are configured to correspond to the pivot apertures 111 of the first supporting frame 11 and the pivot apertures 121 of the second supporting frame 12 and secured by the pivoting members 103. The connecting apertures 102 are provided at one corner of the first board member 10, and the connecting apertures 102 are configured to correspond to pivot apertures 121 of the second supporting frame 12 and the connecting hole 130 of the first connecting rod 13 and secured by the pivoting members 103 and the nut 104. The covering portion 105 is provided on the first board member 10 adjacent to the inclined plate 100. The covering portion 105 is configured to support the second supporting frame 12 to increase the bearing load of the first board member 10.

The first supporting frame 11 with a U-shaped frame has two rolling wheels 110 and a plurality of pivot apertures 111. The rolling wheels 110 are disposed at two ends of the first supporting frame 11, and the rolling wheel 110 further has a stopper. The pivot apertures 111 are disposed on the first supporting frame 11, configured to correspond to the pivot apertures 101 of the first board member 10 adjacent to the inclined plate 100 and secured by the pivoting members 103.

The second supporting frame 12 with a U-shaped frame has two rolling wheels 120 and a plurality of the pivot apertures 121. the rolling wheel 120 are disposed at two ends of the second supporting frame 12, and the pivot aperture 121 are disposed on the second supporting frame 12 configured to correspond to the pivot apertures 101 of the first board member 10 adjacent to the inclined plate 100 and secured by the pivoting members 103.

The first connecting rod 13 with a U-shaped frame has a connecting hole 130, a plurality of securing holes 131 and a plurality of pivoting members 132. The connecting hole 130 is provided at one end of the first connecting rod 13, and the connecting hole 130 is configured to correspond to one of the pivot aperture 121 of the second supporting frame 12 and the connecting aperture 102 of the first board member 10 and secured by the pivoting members 103 and the nut 104. The securing holes 131 are provided at another end of the first connecting rod 13.

The second connecting rod 14 with a U-shaped frame has a round-shaped end and a diagonal-shaped end, also has a plurality of positioning apertures 140, a plurality of securing holes 141 and a connecting hole 142. The plurality of positioning aperture 140 and the connecting hole 142 are disposed on the second connecting rod 14 from round-shaped end, and the securing holes 141, the positioning apertures 140 are configured to correspond to the securing hole 131 of the first connecting rod 13. The positioning aperture 140 are configured to provide different lengths for second connecting rod 14 to be connected to the first connecting rod 13 and secured by the pivoting member 132. The securing hole 141 is configured to correspond to the positioning aperture 150 of the second plate 15 and secured by the pivoting member 152. The connecting hole 142 is provided on the round-shaped end of the second connecting rod 14, and the connecting hole 142 is s configured to correspond to one of pivot apertures 121 of the second supporting frame 12 and the connecting aperture 102 of the first board member 10 and secured by the pivoting members 103 and the nut 104.

The second plate 15 with a U-shaped frame has a plurality of positioning apertures 150, a plurality of pivot aperture 151 and a pivoting member 152. The positioning apertures 150 are provides at one side of the second plate 15, configured to correspond to the second connecting rod 14 of the securing hole 141, and secured by the pivoting members 152. The pivot aperture 151 are provides at two opposite corners of the second plate 15.

The third supporting frame 16 with a U-shaped frame has two rolling wheels 160 and a plurality of pivot apertures 161. The rolling wheels 160 are disposed at two ends of the third supporting frame 16, the pivot aperture 161 are provided on the third supporting frame 12, configured to correspond to the pivot aperture 151 of the second plate 15 and secured by the pivoting members 152.

Figure 3:
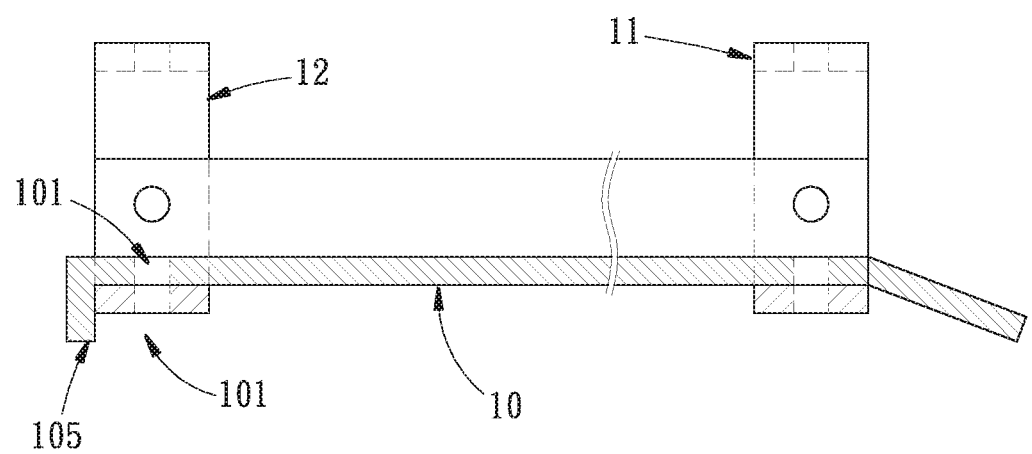
FIG. 3 is a cross-sectional view of the first board member of the motor dolly according to the embodiment of the present invention.

As shown in FIG. 3, the pivot apertures 101 are disposed between the two covering portions 105 of the first board member 10, and the pivot apertures 101 on each side of the first board member 10 are configured to correspond.

Figure 4:
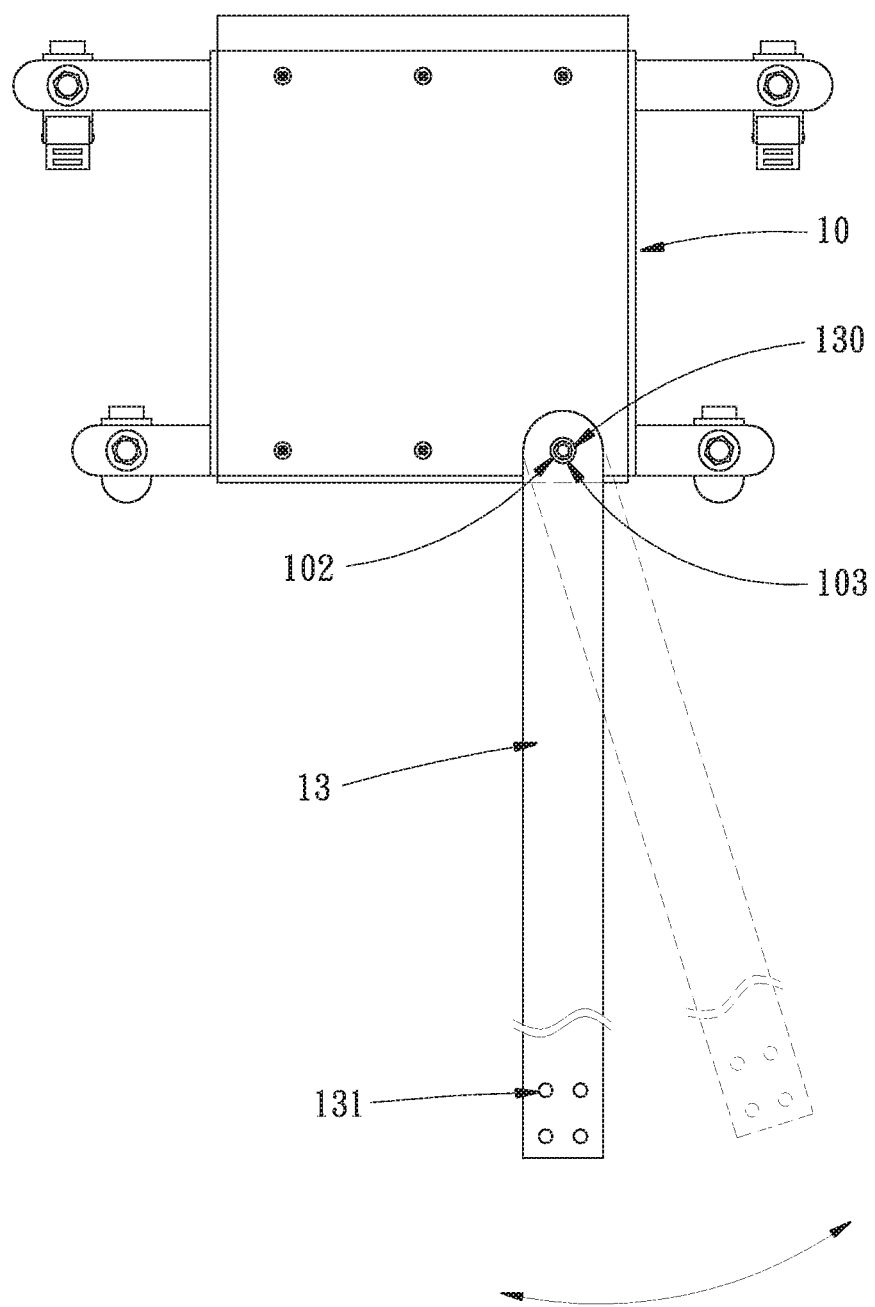
FIG. 4 is a schematic drawing of the movements of the first connecting rod of the motor dolly according to the embodiment of the present invention.
Figure 5:
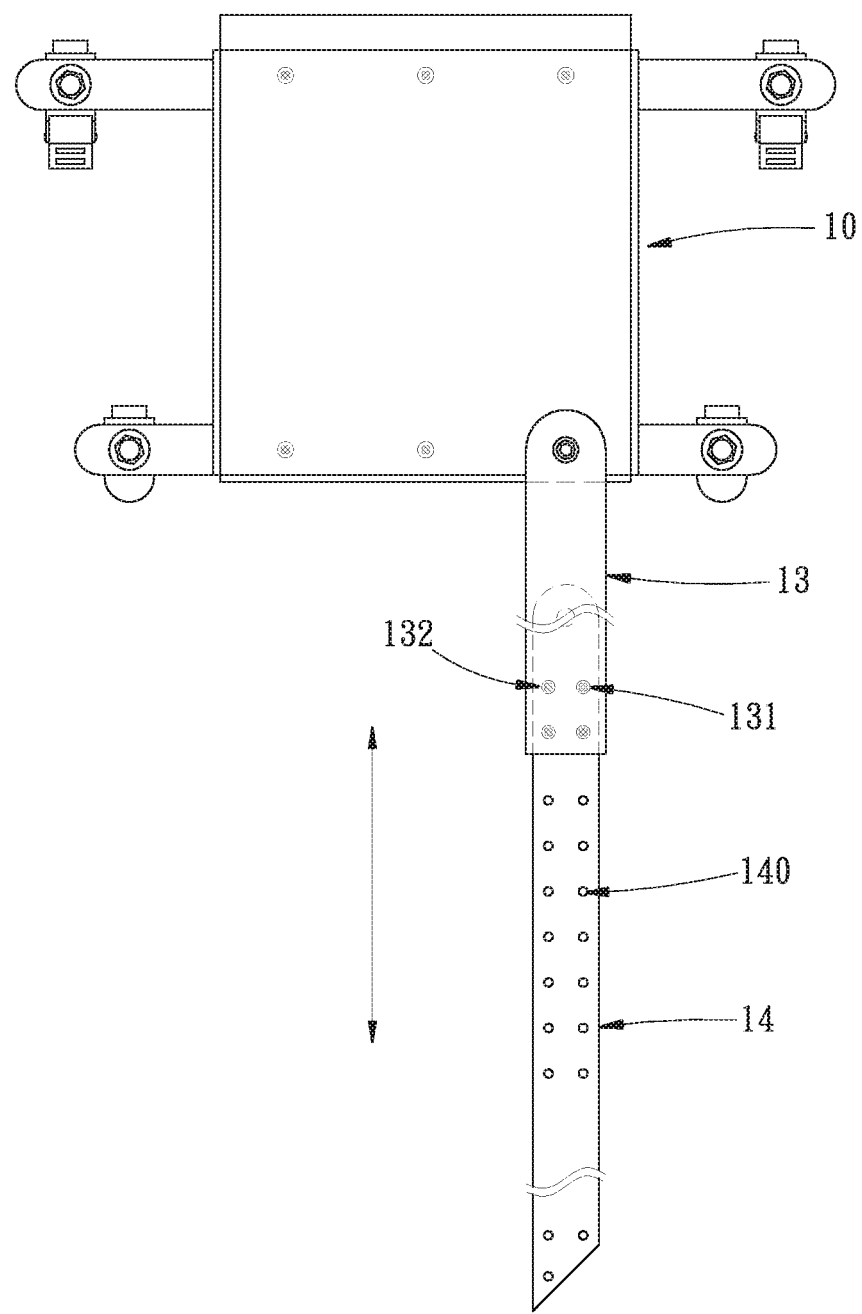
FIG. 5 is a schematic drawing of the movements of the second connecting rod of the motor dolly according to the embodiment of the present invention.
Figure 6:
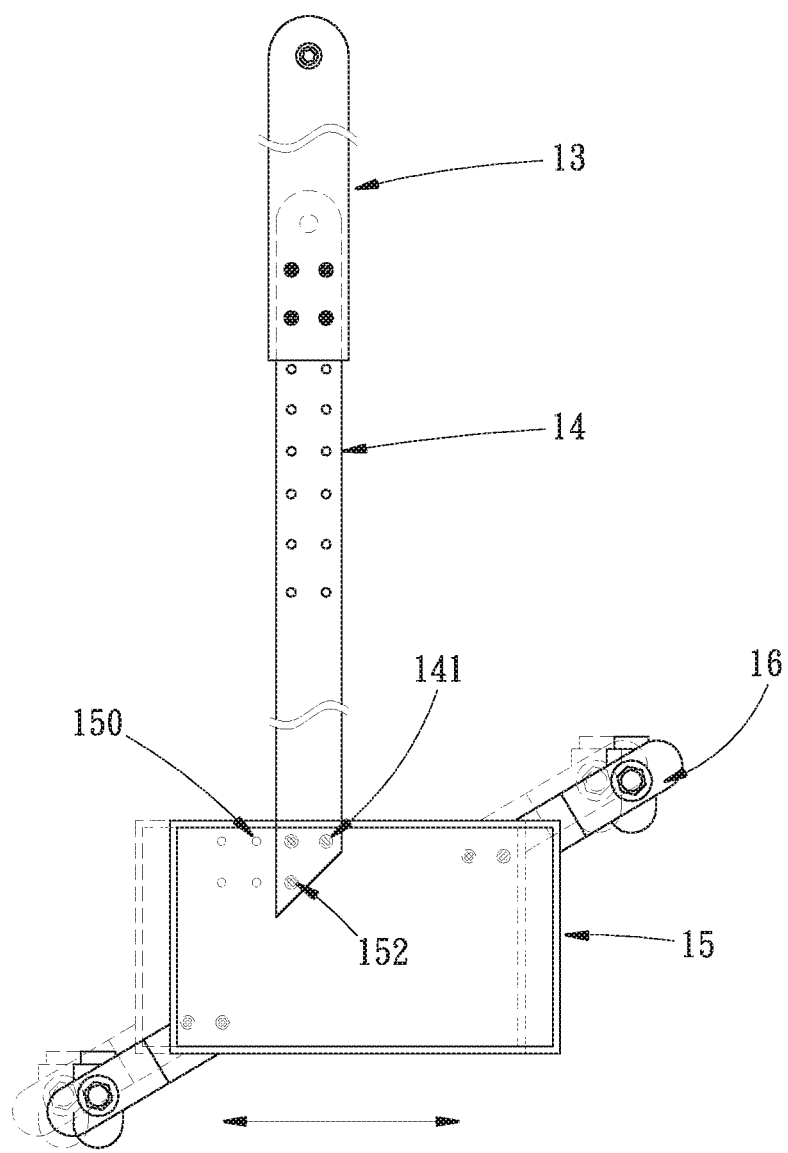
FIG. 6 is a schematic drawing of the movements of the second plate of the motor dolly according to the embodiment of the present invention.

As shown in FIGS. 4-6, the connecting aperture 102 of the first board member 10 are aligned with the connecting hole 130 of the first connecting rod 13 and secured by the pivoting members 103. The first connecting rod 13 is capable of rotating around the connecting hole 130 such that the first board member 10 can rotate to left or right.

As shown FIG. 5, the securing holes 131 of the first connecting rod 13 are aligned with the positioning aperture 140 of the second connecting rod 14, and secured by the pivoting members 132. The positioning apertures 140 of the second connecting rod 14 allow the second connecting rod 14 to have connecting different lengths with the first connecting rod 13 which are suitable for different motorcycle models.

As shown FIG. 6, the securing holes 141 of the second connecting rod 14 are aligned with the positioning aperture 150 of the second plate 15 and secured by the pivoting members 152. Three of the positioning apertures 150 of the second plate 15 are secured, and the securing holes 141 and the positioning aperture 150 are secured in a triangular arrangement such that the second plate 15 can be secured onto the second connecting rod 14 with various angles.

Figure 7:
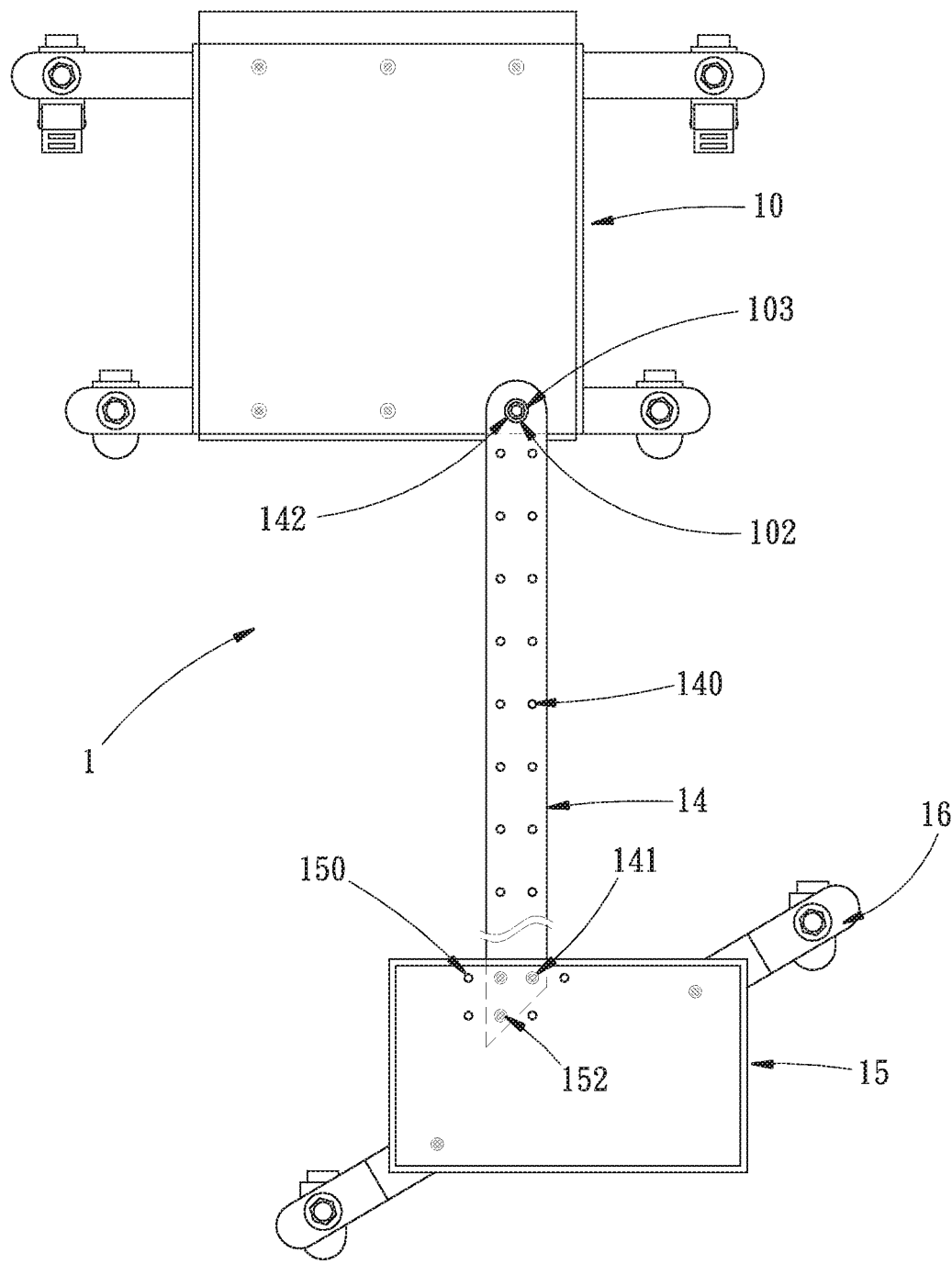
FIG. 7 is a schematic drawing of the second connecting rod of the motor dolly according to the embodiment of the present invention.

As shown FIG. 6 and FIG. 7. When a distance between the rear wheel and the stand kick of the motorcycle is shorter than a shortest connecting distance between the first connecting rod 13 and the second connecting rod 14, the connecting hole 142 of the second connecting rod 14 can be secured with connecting aperture 102 of the first board member 10 by the pivoting member 103. Furthermore, the securing holes 141 of the second connecting rod 14 are aligned with the positioning apertures 150 of the second plate 15 and secured by the pivoting member 152. Therefore, the second connecting rod 14 can be used for directly connecting the first board member 10 and the second plate 15.

Figure 8:
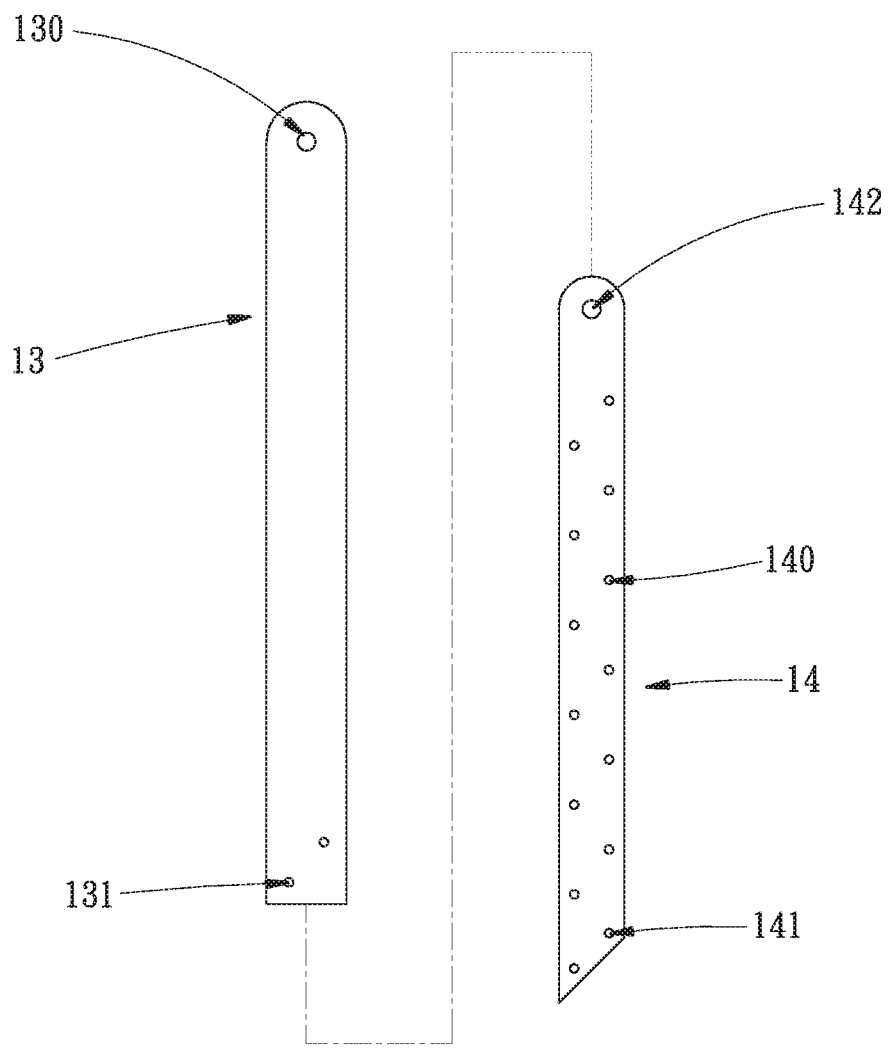
FIG. 8 is a schematic drawing of the first connecting rod and the second connecting rod of the motor dolly according to the embodiment of the present invention.
Figure 9:
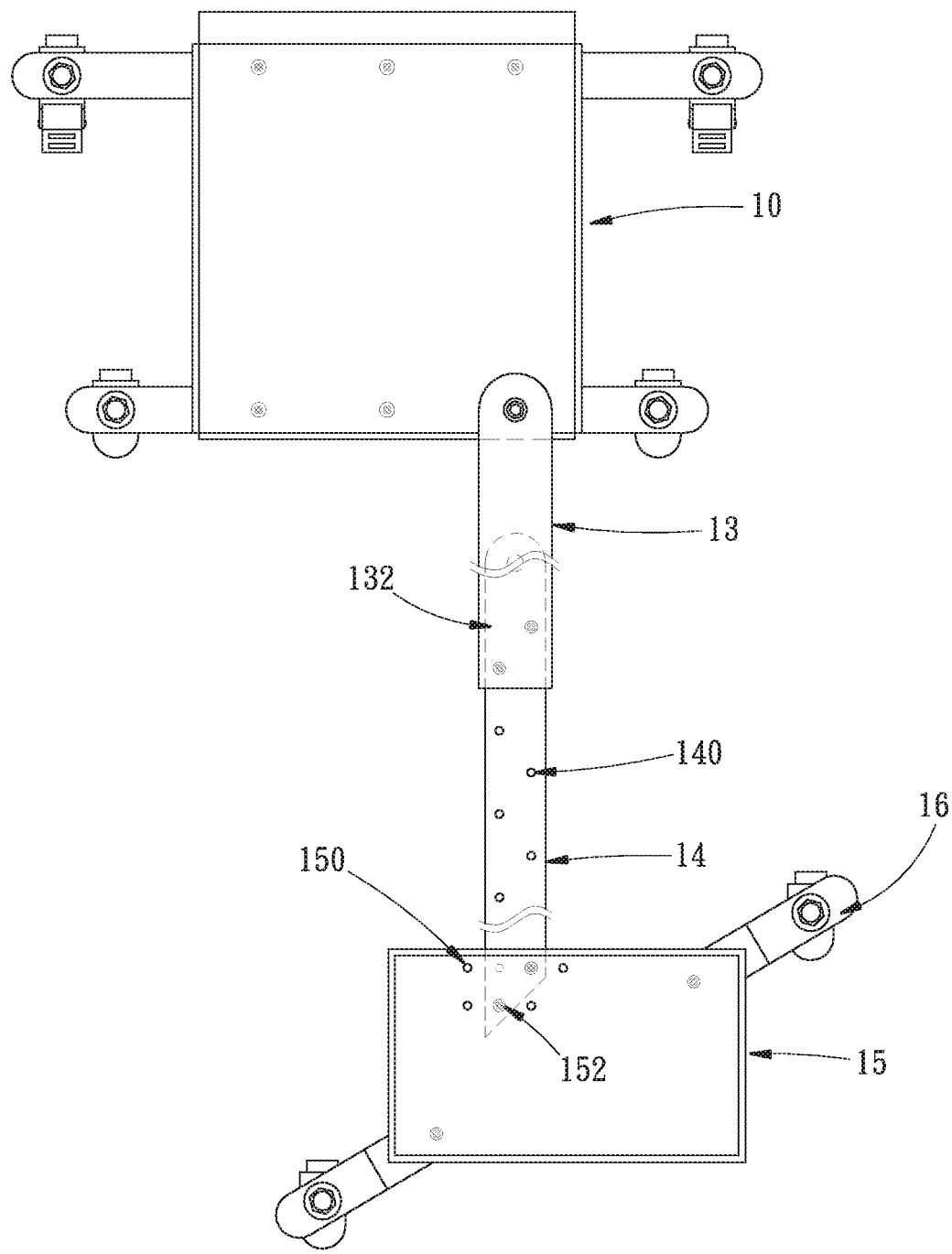
FIG. 9 is another schematic drawing of the first connecting rod and the second connecting rod of the motor dolly according to the embodiment of the present invention.
Figure 10:
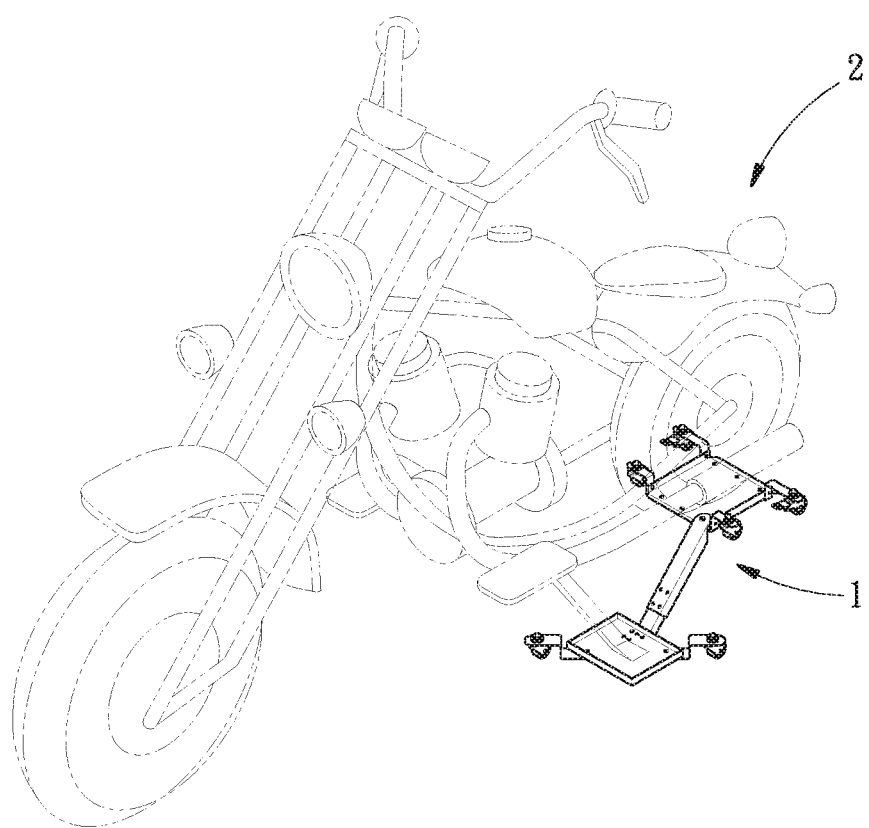
FIG. 10 is a schematic drawing of the motor dolly in actual operation according to the embodiment of the present invention.

As shown FIG. 8 and FIG. 9, the two securing holes 131 of the first connecting rod 13 are disposed diagonally, and the plurality of positioning apertures 140 of the second connecting rod 14 are also disposed diagonally. When the first connecting rod 13 and the second connecting rod 14 are connected, one end of the first connecting rod 13 is secured onto the first board member 10 and one end of the second connecting rod 14 is secured onto the second plate 15.

With a connection among the first board member 10, the first connecting rod 13, the second connecting rod 14 and the second plate 15, the motor dolly 1 is suitable for various motorcycle models.

Although the present invention has been explained in relation to its preferred embodiment, it is to be understood that many other possible modifications and variations can be made without departing from the spirit and scope of the invention as hereinafter claimed.

What is claimed is:
1. A motor dolly comprising:
a first board member having an inclined plate, a plurality of pivot apertures, a connecting aperture, a plurality of pivoting members, a nut and two covering portions, the covering portions pushing against a second supporting frame, the second supporting frame having at least two rolling wheels and a plurality of pivot apertures, the plurality of pivot apertures of the second supporting frame corresponding to the plurality of pivot apertures of the first board member;
a first supporting frame having at least two rolling wheels and a plurality of pivot apertures, the plurality of pivot apertures of the first supporting frame corresponding to the plurality of pivot apertures of the first board member;
a first connecting rod having a connecting hole, a plurality of securing holes and a plurality of pivoting members, the connecting hole of the first connecting rod corresponding to the connecting aperture of the first board member;
a second connecting rod having a plurality of positioning apertures, a plurality of securing holes and a connecting hole, the positioning apertures of the second connecting rod corresponding to the securing holes of the first connecting rod;
a second plate having a plurality of positioning apertures, a plurality of pivot apertures and a plurality of pivoting members, the positioning apertures of the second plate corresponding to the securing holes of the second connecting rod; and a third supporting frame having two rolling wheels and a plurality of pivot apertures, the pivot apertures of the third supporting frame corresponding to the pivot apertures of the second plate.

2. The motor dolly as claimed in claim 1, wherein the first connecting rod is capable of pivoting around the connecting hole to provide different ranges.

3. The motor dolly as claimed in claim 1, wherein the plurality of positioning apertures of the second connecting rod are disposed linearly which allows different connection lengths between the second connecting rod and the first connecting rod.

4. The motor dolly as claimed in claim 1, wherein the securing holes of the second connecting rod are configured to correspond to the positioning apertures of the second plate three of the positioning apertures of the second plate are secured to the securing holes of the second connecting rod, and the securing holes of the second connecting rod and the positioning apertures of the second plate are secured in a triangular arrangement such that the second plate is secured onto the second connecting rod with various angles.

5. The motor dolly as claimed in claim 1, wherein the connecting holes of the second connecting rod are configured to correspond to the positioning apertures of the second plate, and the second connecting rod is used to directly connect the first board member and the second plate.

6. The motor dolly as claimed in claim 1, wherein the two securing holes of the first connecting rod are disposed diagonally.

7. The motor dolly as claimed in claim 1, wherein the plurality of positioning apertures of the second connecting rod are disposed diagonally.

* * * * *